(12) United States Patent
Moreau (10) Patent No.: US 7,469,658 B2
(45) Date of Patent: Dec. 30, 2008

(54) CHANNEL STANCHION FOR ELEVATED BEAM COW STALL ASSEMBLY

(75) Inventor: Joseph R. Moreau, Clinton, NY (US)

(73) Assignee: Norbco, Inc., Westmoreland, NY (US)

( * ) Notice: Subject to any disclaimer, the term of this patent is extended or adjusted under 35 U.S.C. 154(b) by 441 days.

(21) Appl. No.: 11/184,410

(22) Filed: Jul. 19, 2005

(65) Prior Publication Data

US 2005/0263092 A1 Dec. 1, 2005

Related U.S. Application Data

(63) Continuation-in-part of application No. 10/666,874, filed on Sep. 19, 2003, now Pat. No. 6,925,962.

(51) Int. Cl.
*A01K 1/00* (2006.01)
(52) U.S. Cl. .................................................. 119/516
(58) Field of Classification Search ................ 119/516, 119/519, 520, 523; D30/108, 114
See application file for complete search history.

(56) References Cited

U.S. PATENT DOCUMENTS 6,698,964 B2 * 3/2004 DaSilveira .................. 403/218

* cited by examiner

*Primary Examiner*—Michael R. Mansen
*Assistant Examiner*—Monica L Williams
(74) *Attorney, Agent, or Firm*—Bernhard P. Molldrem, Jr.

(57) ABSTRACT

An elevated-beam cow stall assembly has a plurality of tubular cow stall dividers supported on a single horizontal beam. This provides room for the cow to lunge slightly to assist her in lying down or getting up. In an embodiment, stanchions or brackets are formed of vertical channel members affixed onto the beam. The tubular stall dividers each have an upper and a lower horizontal rail, the ends of which are mounted into the upper and lower ends of the channel member. Short upper and lower channel portions are fastened to the main vertical channel members, web-to-web, and the tubular stall dividers from a facing row of stalls are mounted on these. The brackets or stanchions may be mounted to the beam using square U-bolts, or by other techniques such as welding.

12 Claims, 7 Drawing Sheets

CHANNEL STANCHION FOR ELEVATED BEAM COW STALL ASSEMBLY

This is a Continuation-in-Part of my application Ser. No. 10/666,874, filed Sep. 19, 2003, now U.S. Pat. No. 6,925,962, granted Aug. 9, 2007.

BACKGROUND OF THE INVENTION

This invention relates in general to the construction of animal stalls, i.e., stalls for dairy animals, and is more specifically directed to an improved arrangement of stall dividers forming double rows of cow stalls, especially suited for freestall dairy barns. In particular, the invention is related to a system in which a number of cow stall dividers can be supported on a single transverse beam that is elevated above the floor of the stall.

Freestall dairy barns, also known as loose housing, have become an attractive option for dairy farmers who want to maintain and manage a large dairy herd. The advantages of the freestall housing system include reduction of bedding per cow, less space per cow, ease of manure removal, reduced udder washing time before milking, higher milk quality, and less frequent udder injury. The large cattle population housed within the barn, requires the design of the barn to pay attention to the areas where the cows rest, i.e., the free stalls.

As a matter of background, general guidelines for constructing and employing freestall barns for a dairy herd are found in Robert E. Graves, Guideline for Planning Dairy Freestall Barns, Northeast Regional Agricultural Engineering Service Cooperative Extension, Ithaca N.Y., 1995. Other useful background information can be found in Moeller et al., Free-Stall Loose Housing for Dairy Cattle, ID-63, Purdue University Cooperative Extension Service; Hammond, Dairy Free Stall Design, University of Georgia College of Agricultural and Environmental Services Cooperative Extension Service; and Chastain et al., Dairy Lighting System for Free Stall Barns and Milking Centers, Pub. AEU-12, University of Minnesota Extension Service, Department of Biosystems and Agricultural Engineering, August 1966.

A number of free stall designs have employed tubular, loop-like stall dividers to minimize the need for structural elements at the front and sides of the animals, to give the animal increased freedom of movement when standing or lying in the stall, and to facilitate rising from a lying position. On the one hand, conventional free stall designs have required a pair of vertically-spaced horizontal beams or similar support rails strung one above the other, and supported on the vertical posts, with the stall dividers being supported on the two horizontal beams. An example is described in Albers, Jr. U.S. Pat. No. 6,026,766. Another proposed free stall divider system is discussed in Rudolph U.S. Pat. No. 6,230,658 and another still is discussed in Hatfield U.S. Pat. No. 6,318,297. The stall systems described there do not employ a forward horizontal beam as a major support member, and thus require either a vertical post per each stall divider, or omission of the posts altogether.

An arrangement with one vertical post for each stall does provide an open front for the stalls, but this requires concrete supporting curbs, which are expensive to install.

It is advantageous to have an open area for the first thirty-six inches or so above the floor at the front of each cow stall to give the animal freedom of movement to assist her in lying and standing. It has been observed that structural elements that are much below about 36 inches over the floor can get in the way of natural motion of the cow. For example, when cows lie down and when they rise from a lying position, the cows will lunge forward somewhat. If there are obstructions present, a cow may injure her head or foreleg on them. Accordingly, there are advantages in overall cow comfort and safety if a lower support beam can be omitted. On the other hand, a horizontal rail or beam, placed above that level, could serve to support a number of stall dividers, providing economy of construction and sufficient strength to withstand the normal use expected by large animals. However, no suitable system of construction of a cow stall arrangement for a freestall barn has yet been proposed.

OBJECTS AND SUMMARY OF THE INVENTION

Accordingly, it is an object of this invention to provide a cow stall arrangement for a freestall dairy barn which overcomes the drawbacks of the prior art.

It is another object to provide a cow stall arrangement which can be easily field-installed.

It is a further object to provide a cow stall arrangement that employs only a single horizontal support beam at the front of the line of stalls to support the weight of the stalls, and which can support double ended dividers to create a double row of stalls.

It is another object to provide a cow stall arrangement that can be installed onto a series of vertical posts that are arranged in alignment with one another on the floor of a cow stall.

In accordance with an aspect of this invention, an elevated-beam cow stall assembly is erected on a series of posts, including at least a pair of vertical posts installed in a floor of a row of cow stalls. Angle brackets may serve as the supports for the horizontal beam, with each being installed on a respective one of these posts. These angle brackets can have a side plate mounted onto the associated post, and an apertured back plate. Support stanchions or brackets may be provided to support the dividers. These stanchion each may favorably be formed of a vertically extending channel member having a web facing against the beam and a pair of side flanges. The upper and lower tubes or rails of the stall divider are mounted to receivers formed at upper and lower ends of the stanchion, with the ends of the divider rails fitting into the open side of the stanchion and bolted in place. Upper and lower channel segments may be affixed with their webs bolted or welded to the web of the stanchion, and forming receivers for the upper and lower tubes of the corresponding divider from a facing row. These tubes are secured into these upper and lower channel segments. The horizontal beam or rail is affixed onto the back plates of these angle brackets and this beam extends transversely from post to post, and extends beyond the posts. In some alternative embodiments, the horizontal beam may be bolted or welded to the posts.

Neck pipes or neck rails may be attached to the upper rails of the dividers, and brisket rails or brisket pipes may also be supported on the lower rails of the dividers, each extending in the transverse direction. These may provide some of the structural strength of the stall system.

In a preferred embodiment, the vertical stanchions each comprise a vertical channel member. The open side of the main channel member, and the open sides of the upper and lower channel segments project in two opposite directions, i.e., fore and aft, such that a pair of facing stall dividers may be supported on each stanchion. In preferred embodiments, each channel member is oriented with a web thereof on an upward facing side, and an open side facing downwards.

In other embodiments, the stanchion can be formed unitarily with the upper or lower rail of the divider, and can be affixed directly onto the horizontal support beam. This can involve having the proximal end of the lower rail of the divider bending upwards and meeting the upper rail at or near the position where the divider is supported onto the horizontal beam. It is also possible to secure the divider to the horizontal beam by welding directly to the beam or onto a support plate or gusset. The divider may instead be secured by another equivalent bonding technique.

The above and many other features, objects, and advantages of this invention will become apparent from the ensuing description of a preferred embodiment, which is to be read in connection with the accompanying Drawing.

DETAILED DESCRIPTION OF A PREFERRED EMBODIMENT

Figure 1:
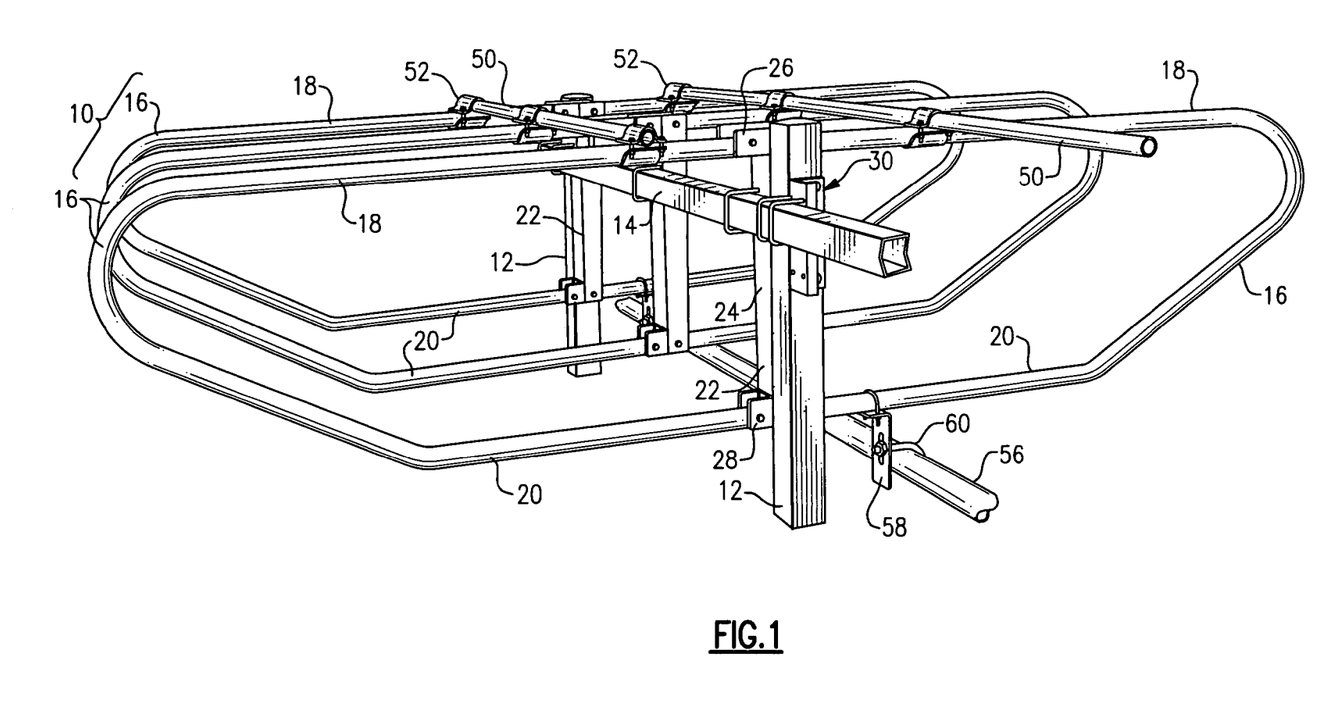
FIG. 1 is a perspective view of a portion of the cow stall assembly according to one embodiment of this invention.
Figure 2:
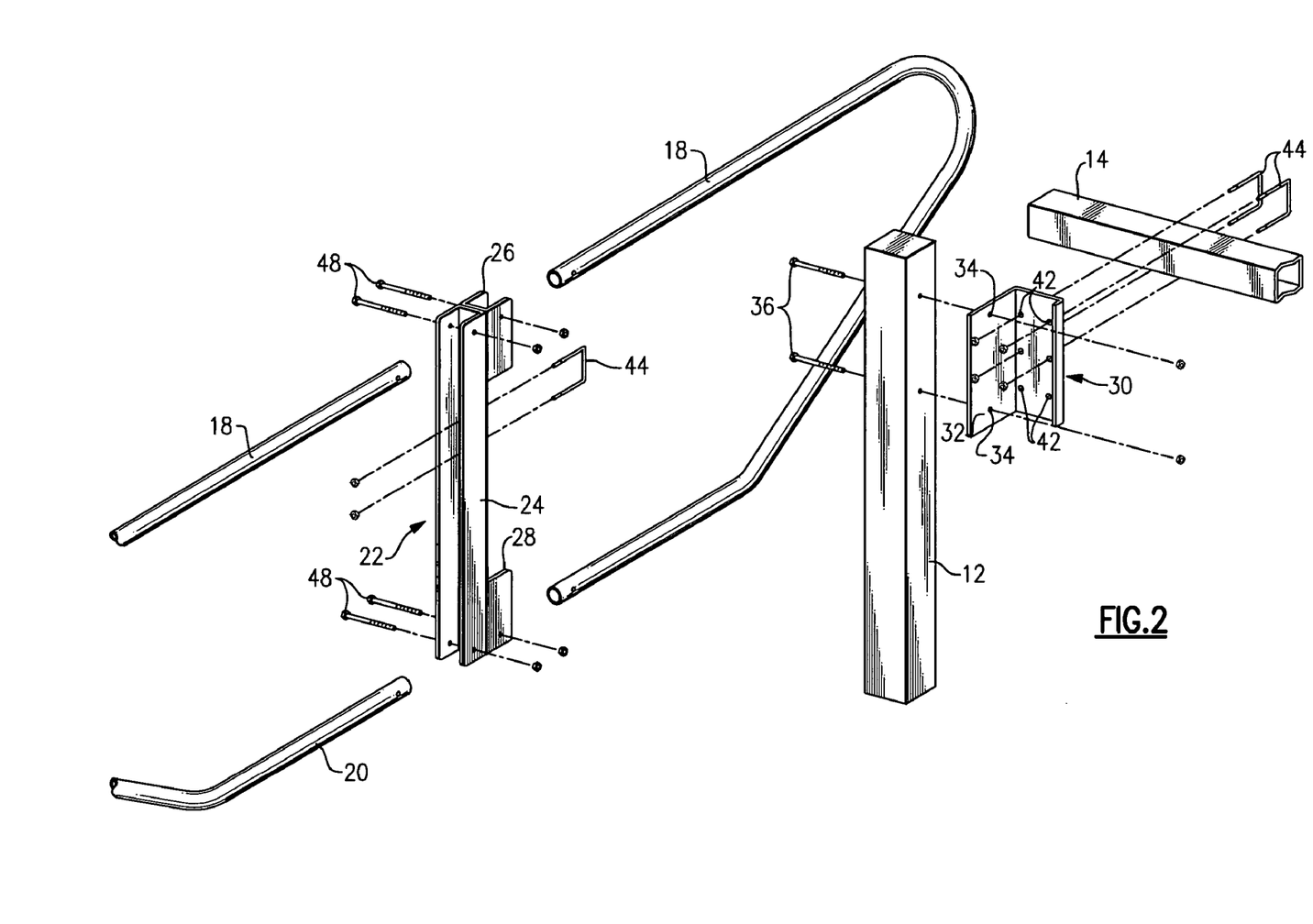
FIG. 2 is an assembly view of a portion of the cow stall assembly of this embodiment.
Figure 3:
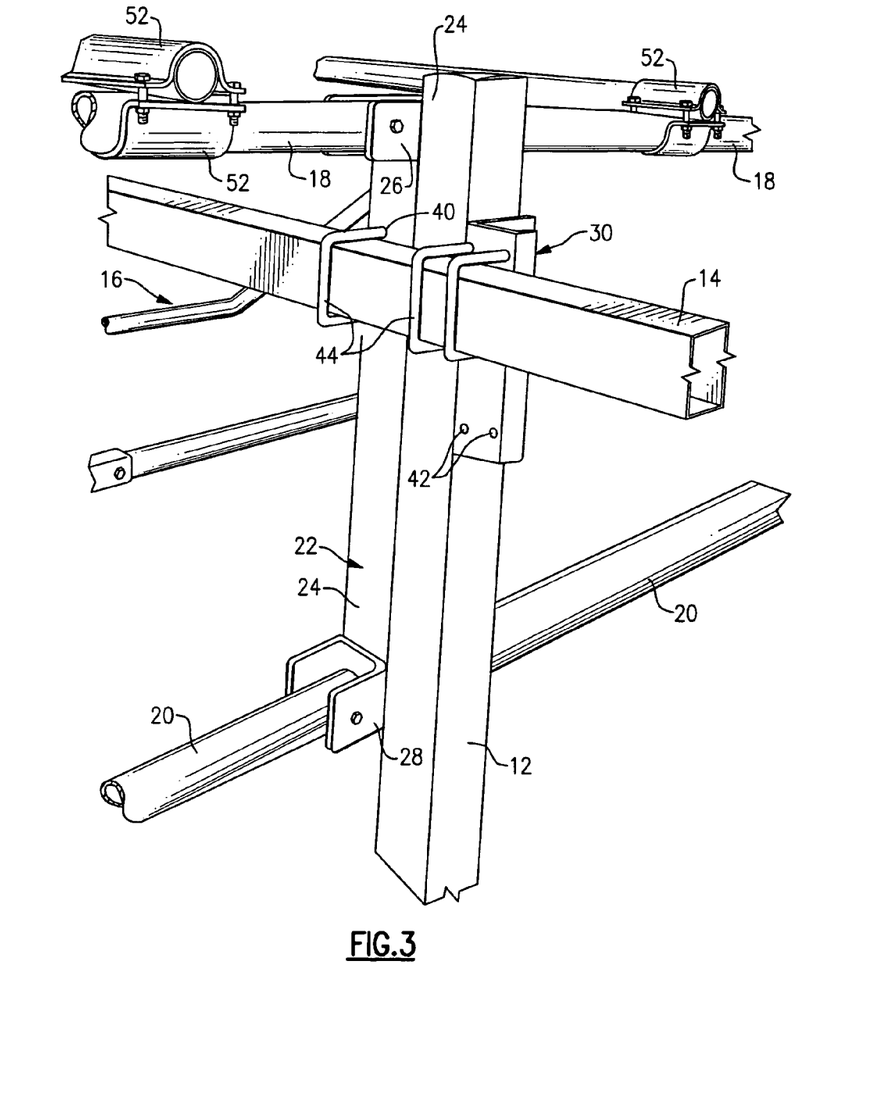
FIG. 3 is a detail perspective of a portion of this embodiment.
Figure 4:
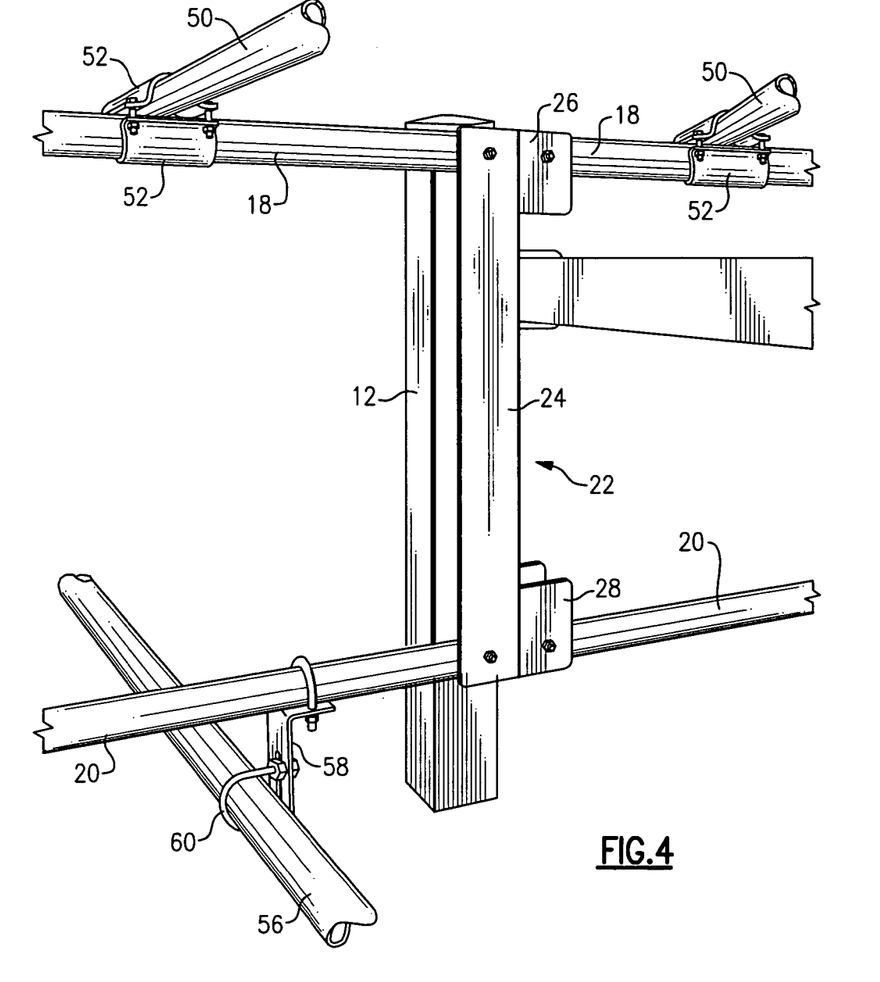
FIG. 4 is a detail perspective of another portion of this embodiment.

With reference to the Drawing, and initially to FIG. 1, with additional reference to FIGS. 2, 3, and 4, an embodiment of a freestall double-row cow stall assembly 10 is formed from a number of vertical posts 12 mounted in the floor of the cow stall, and which may, e.g., be steel or wood columns, e.g., a laminate wood construction. The floor may be concrete, earth, sand, or other material, and the posts 12 may be planted in the floor, or may be suspended from above. The posts 12 are aligned with one another right to left, and define a center line between two facing rows of stalls. A horizontal support beam 14 extends the length of the cow stall assembly, and while not shown here, there may be means for joining sections of the beam to one another, end-to-end. The horizontal support beam 14 is mounted onto the posts 12, at a position about thirty-four to thirty-eight inches above the floor. Here, a single support beam 14 is used, which provides an unobstructed space beneath the beam 14 to make it easier for a cow in the stall to rise up to her feet from a resting position. However, the beam 14 is still low enough to prevent or discourage the cow from walking through the front end of the stall into the facing stall row. In this embodiment, the beam 14 is of square cross section, but other embodiments could employ a beam of a different shape, e.g., I-beam, round or hexagonal.

Here, the stalls are defined by a series of stall dividers 16, and in this embodiment the dividers 16 are tubular loop-type dividers, formed of a single tubular rail bent into a loop having a generally horizontal upper rail 18 and a generally horizontal lower rail 20. The stall dividers can be of other shapes and dimensions, and may use rails of round, square or other cross section.

Support stanchions or brackets 22 are provided to attach the stall dividers 16 onto the horizontal beam 14, with one support stanchion 22 being provided for each facing pair of stall dividers 16. Each stanchion 22 is formed of a main vertical channel member 24 with an additional channel member 26 affixed at the top end of the main channel member 24, and a channel member 28 at the bottom portion of the vertical channel member 24. In this embodiment, the two channel members 26, 28 are bolted or welded onto the main channel member 24. The channels are oriented with their webs back to back, and their open side facing outwards to receive the ends of the upper and lower rails of the dividers. The flanges are disposed to the sides, and the dividers can be secured by bolts passing through openings in the flanges and corresponding bolt holes in the upper and lower rails. In other embodiments, the stanchions could be formed of tubular sleeves, or members of a variety of other shapes. Also, the vertical channel member 24 can be of a profile that is square, as shown, or of another shape.

In one alternative embodiment (not shown), there can be vertical channel members disposed on both sides of the horizontal beam 14 with the web sides placed against the beam, and secured to one another and to the beam by means of bolts passing through holes above and below the beam. In such case, additional brace members would be attached between the two channel members, i.e., at the top and bottom, above and below the beam. These additional braces would transfer forces from the divider to the divider on the facing side and relieve some of the stresses on the beam.

In this illustrated embodiment, angle brackets 30 are employed to attach the horizontal beam 14 to the posts 12. Each angle bracket 30 has a side plate 32 that mounts against one side of the associated post 12. The side plate 32 has upper and lower bolt holes 34 that receive bolts 36 or other suitable fasteners that penetrate through the post 12. The bolts 36 pass through the transverse direction of the post 12, and when laminated posts are used, this corresponds to the stack direction, so that the bolts pass through the laminations, rather than cutting between them. Thus, in such case the bolts and side plate tend to compress the laminations together and strengthen the post structure.

An apertured back plate 38 is joined at a right angle to the side plate of the angle bracket 30. Here, the back plate 38 has three pairs of bolt holes 42 at spaced levels. A pair of square-end U-bolts 44 are positioned over the beam 14 and fit into respective ones of two of the pairs of bolt holes 42 to clamp the beam 14 securely in place on the angle bracket. Another square end U-bolt 44 fits over the beam 14 and has its threaded arms passing through upper and lower bolt holes 40, respectively, in the flat web portion of the stanchion channel member 24 to clamp the stanchion in place onto the horizontal support beam 14. The open side of the channel member 24, and the open sides of the additional channel members 26, 28 face in opposite outward directions.

The ends of the upper and lower rails 18, 20 of the dividers fit into the upper and lower ends of the channel member 24, or into the upper and lower channel members 26, 28, and are retained by means of bolts 48 that pass through openings in the channel members and corresponding openings in the rails, as shown.

Neck rails 50, here in the form of tubes or pipes, are attached onto the upper rails 18 of the stall dividers, and extend horizontally and transversely, i.e., parallel to the support beam 14. These are secured by mating pairs of omega clamps 52, with one omega clamp placed beneath the upper rail 18 of each divider and another omega clamp placed above the neck rail 50. Neck rails 50 are situated in corresponding positions on both rows of the double-row cow stall arrangement. The neck rails 50 serve to help position the cow when standing, and also furnish additional lateral strength to the cow stall assembly.

A brisket rail 56 is also shown here attached onto the bottom rails 20 of the stall dividers. In this embodiment, the brisket rail 56 is favorably formed as a polyethylene plastic pipe, with a nominal diameter of five inches. There are L-shaped hangers 58 fitted onto each of the bottom rails 20 and each has a J-bolt 60 that secures over the pipe or rail 56. There may be a vertical slot in the hanger 58 to permit vertical adjustment of the positioning of the rail 56. The rail 56 is positioned near the floor as a mild restraint to the cow, but will permit the cow to step over when she lunges as she rises from a lying position. The plastic rail 56 has good linear rigidity, and provides some additional structural support for the dividers 12, but is yielding enough that is does not injure the cow's forelegs when she steps against it or kicks it.

For reasons of avoiding drawing clutter only a single brisket rail 56 is shown here. In practice there would be a brisket rail installed on each row of cow stalls. Also, a different means of attachment or installation of the brisket rail could be used, or a flat brisket board could be used instead of a tubular rail. Also, the brisket rail could be attached directly to the floor, rather than being suspended from the divider lower rails.

Figure 5:
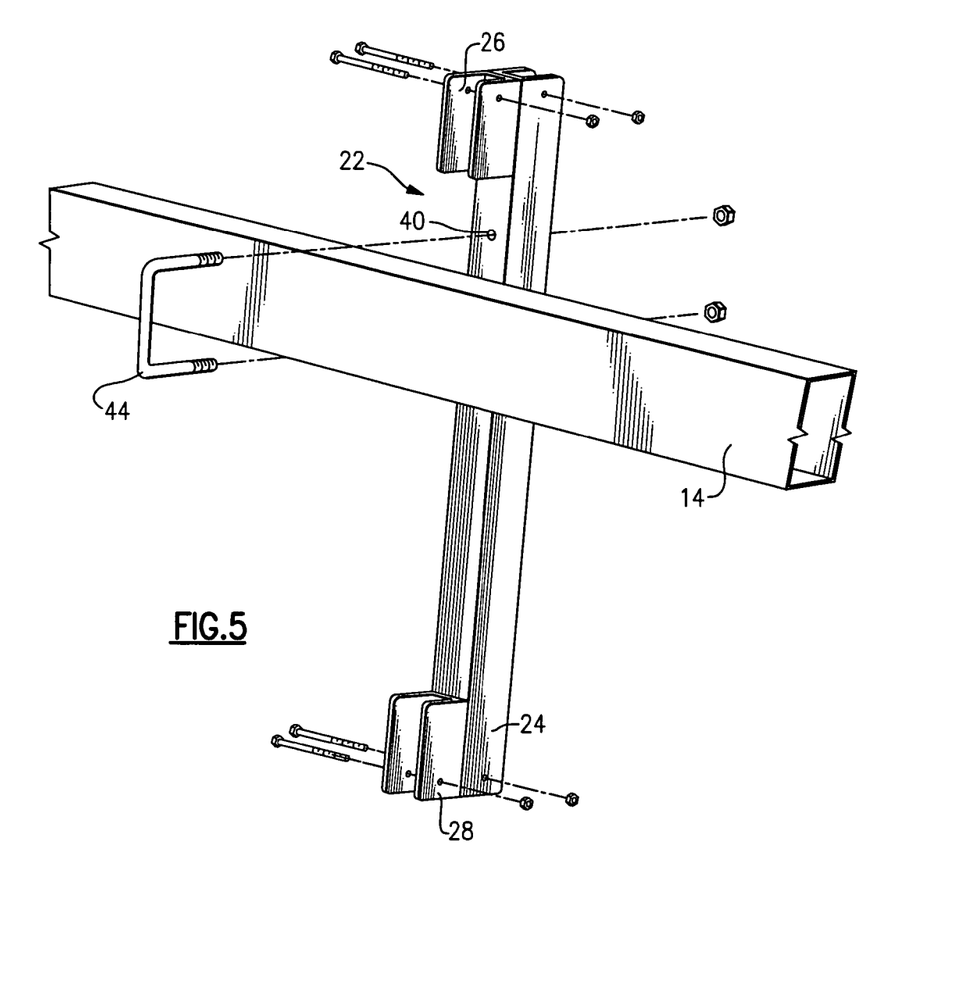
FIG. 5 is an assembly view of a portion of this embodiment.

As illustrated in FIG. 5, the remaining stall dividers at the locations between posts 12 are attached onto stanchions 22 that are also supported directly on the main support beam 14 at positions between the posts 12. Here, these stanchions may be identical with the ones illustrated and described earlier. For each stanchion 22 there is a square-end U-bolt 44 passing over the beam 14, holding the flat web of the channel member 24 against the beam 14. The U-bolt 44 passes through upper and lower bolt holes 40 in the web of the channel member, and is secured by threaded nuts. The upper and lower rails of each divider are be fitted into the upper and lower ends of channel member.

An alternative design for the stanchion 22 can include a downward extension of the stanchion extending terminating in a footing plate. The stanchions with this additional footing can be used at some intermediate positions where there is a long space between successive posts, e.g., distances exceeding about twelve feet.

Instead of the square-end U-bolts 44 the stanchions 22 can be held with a pair of normal long bolts with an apertured mounting plate.

In the cow stall arrangement of this invention, the beam 14 is positioned at about the same distance above the floor as the bend or nose at the front of the cow stall divider 16, where the animal makes contact when entering or leaving the stall. This places the beam 14 at the optimum position for absorbing any torsional forces from the cow pushing against the stall, and minimizes strain on the stanchions and other structural elements.

Here, the beam 14 is a four-inch square beam, but in other arrangements the beam could be a rail of another type or shape, e.g., an I-beam or a tubular round profile beam. The beam 14 must be capable of supporting the stall dividers. In steel barn construction, the beam 14 may be square, round, rectangular, or I-beam. The beam may be attached to the posts using a technique the installer determines is compatible to the main building columns. Also, while the posts 12 shown here are square in cross section, the stall system of this invention could be installed with round tubular posts, or posts of other shapes, materials, or construction.

Although the illustrated embodiment shows the angle bracket 30 and the channel stanchion 22 mounted both on one side of the post 12 in FIGS. 1 and 3, for example, these two members can be mounted on opposite sides of the post 12, as illustrated in the exploded assembly view of FIG. 2.

The stall widths may be set at the appropriate width, depending on the size of the cows in the dairy herd. The heights of the stall dividers can also be set and adjusted at an appropriate level without having to adjust the elevation of the horizontal beam 14. Different shapes of dividers can be used also, without departing from the main principles of this invention.

A single row system could be installed according to the principles of this invention, with the stall dividers 16 placed only on the one side of the beam 14.

Figure 6:
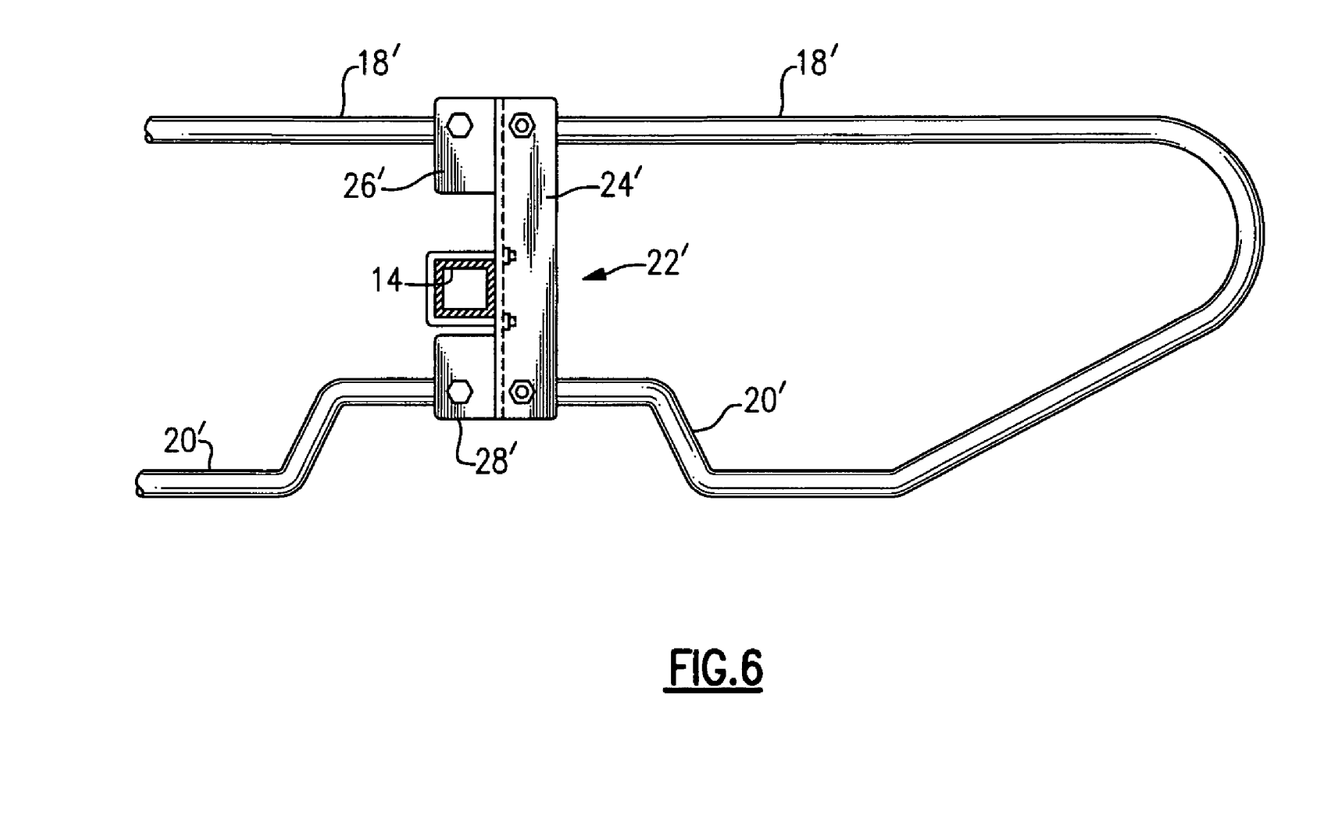
FIG. 6 is a sectional elevation illustrating another embodiment.

FIG. 6 illustrates one alternative embodiment in which a shorter stanchion or bracket 22' is employed, and the front or distal portions of the lower tube 20' are bent upwards so as to meet the lower end of the shorter vertical channel 24', or the additional channel member 28'. The upper tubes 18' are supported at upper receiver portions of the channel members 24', 26'. construction of this cow stall arrangement and stanchion or bracket 22' is otherwise similar to that of FIGS. 1 to 5.

Figure 7:
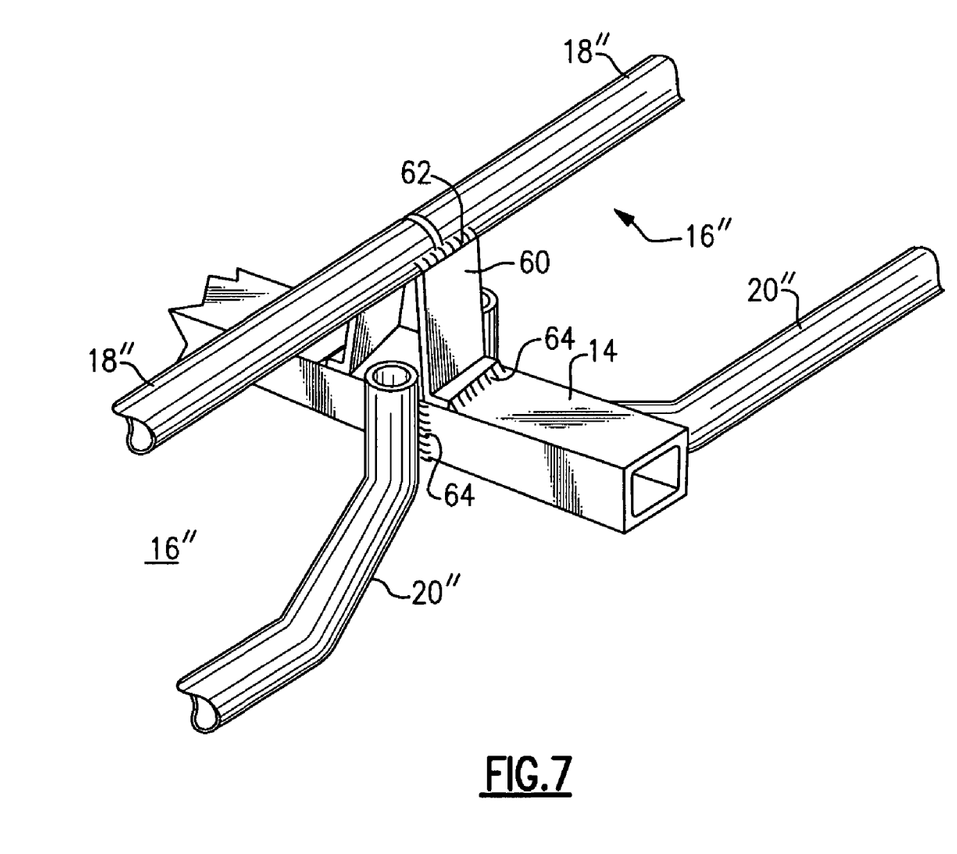
FIG. 7 is a perspective view of yet another embodiment.

FIG. 7 shows another alternative arrangement in which the dividers 16" are secured to the beam 14 by welding. In this embodiment plates or gussets 60 are secured by welds 62 to an upper surface of the beam 14. The ends of the upper tubes 18" of the divider are welded to these plates 60. The distal ends of the lower tubes 20" are bent upwards and can be welded directly to side walls of the beam 14. Here, additional weld beads 64 are shown. This embodiment is illustrative of many possible means of securing the divider or dividers for support on only the single horizontal beam 14.

While the freestall cow stall arrangement of this invention has been described with specific reference to a preferred embodiment, it should be understood that the invention is not limited to that precise embodiment. Rather, many modifications and variations would present themselves to persons skilled in the art without departing from the scope and spirit of this invention, as defined in the appended claims.

I Claim:

1. Freestall elevated beam cow stall assembly, comprising
   a. at least a pair of vertical posts aligned in respect to a floor of a row of cow stalls;
   b. a single horizontal beam supported above said floor and extending transversely between said posts;
   c. a plurality of stall dividers each having an upper generally horizontal rail and a lower rail, and support means being supported off the floor;
   d. means affixing said horizontal beam to said posts; and
   e. means for affixing the support means for each stall divider of said plurality of stall dividers onto said horizontal beam, such that each said stall divider of said plurality and said support means are suspended above said floor only upon said single horizontal beam.

2. The freestall elevated beam cow stall assembly according to claim 1 wherein said beam is supported at least about 34 inches above said floor such that an unobstructed space is provided between said beam and said floor.

3. The freestall elevated beam cow stall assembly according to claim 2 wherein said beam is supported between about 34 and 38 inches above said floor.

4. The freestall elevated beam cow stall assembly according to claim 1 wherein each of said dividers is a loop-type divider formed of a single tubular rail bent into a loop including said upper and lower rails.

5. The freestall elevated beam cow stall assembly according to claim 4 wherein said support means are formed unitarily with said single tubular rail.

6. The freestall elevated beam cow stall assembly according to claim 4 wherein a distal portion of said lower rail is bent upwards towards the distal end of said upper rail.

7. The freestall elevated beam cow stall assembly according to claim 1 wherein said means affixing the support means to said horizontal beam includes at least one weld affixing the one to the other.

8. Freestall elevated beam cow stall assembly, comprising
   a. at least a pair of vertical posts aligned in respect to a floor of a row of cow stalls;
   b. a single horizontal beam supported above said floor and extending transversely between said posts;
   c. a plurality of stall dividers each having an upper generally horizontal rail and a lower rail, and support means supporting distal portions of the upper and lower rails, wherein said support means includes a vertical support stanchion having an upper receiver into which the distal end of said upper rail is attached, a lower receiver into which the distal end of said lower rail is attached, and a web portion that seats against said horizontal beam;
   d. means affixing said horizontal beam to said posts; and
   e. means for affixing the support means for each stall divider of said plurality of stall dividers onto said horizontal beam, such that each said stall divider of said plurality and said support means are suspended above said floor only upon said single horizontal beam.

9. The freestall elevated beam cow stall assembly according to claim 8 wherein said support stanchion includes a channel member formed of said web portion and flanges extending along either side of said web portion at upper and lower ends thereof to define said upper and lower receivers.

10. The freestall elevated beam cow stall assembly according to claim 9 wherein said support stanchion includes additional channel portions attached to the web at positions of the upper and lower receivers to define additional receivers for supporting a second cow stall divider.

11. The freestall elevated beam cow stall assembly according to claim 8 wherein said means for affixing said support means includes a square U-bolt fitted over said horizontal beam, with threaded ends fitting into penetrations in said web, and threaded nuts fitted onto said threaded ends far securing the web on said square U-bolt against a side of said horizontal beam.

12. Freestall elevated beam cow stall assembly, comprising
   a. at least a pair of vertical posts aligned in respect to a floor of a pair of rows of facing cow stalls;
   b. a single horizontal beam supported above said floor and extending transversely between said posts;
   c. a plurality of pairs of stall dividers each having an upper generally horizontal rail and a lower rail, and support means in the form of an elongated vertical member suspended off the floor and having upper and lower portions supporting distal portions of the upper and lower rails of each divider of an associated pair of dividers, such that one divider projects into the row on one side of the posts and the associated divider of that pair projects into the row on the other side;
   d. means affixing said horizontal beam to said posts; and
   e. means for affixing the support means for each of said stall dividers onto said horizontal beam, such that each pair of stall dividers of said plurality of pairs of stall dividers and said support means are suspended off the floor only upon said single horizontal beam.

* * * * *